(12) United States Patent
Chang et al.

(10) Patent No.: US 6,389,166 B1
(45) Date of Patent: May 14, 2002

(54) ON-LINE HANDWRITTEN CHINESE CHARACTER RECOGNITION APPARATUS

(75) Inventors: Yi-Wen Chang, Taipei Hsien; June-Jei Kuo, Taipei, both of (TW)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/376,291

(22) Filed: Aug. 18, 1999

(30) Foreign Application Priority Data

Oct. 26, 1998 (JP) .......................................... 10-303780

(51) Int. Cl.⁷ ........................... G06K 9/00; G06K 9/48; G06K 9/68
(52) U.S. Cl. ........................ 382/188; 382/198; 382/218
(58) Field of Search ................................. 382/185, 186, 382/187, 188, 189, 190, 197, 198, 217, 218, 224, 225, 229, 258; 345/171, 469; 341/28

(56) References Cited

U.S. PATENT DOCUMENTS

| | | | | |
|---|---|---|---|---|
| 4,689,743 A | * | 8/1987 | Chiu | 341/20 |
| 4,990,903 A | * | 2/1991 | Cheng et al. | 345/471 |
| 5,923,778 A | * | 7/1999 | Chen et al. | 382/185 |
| 6,041,137 A | * | 3/2000 | Van Kleeck | 382/185 |
| 6,275,611 B1 | * | 8/2001 | Parthasarathy | 382/187 |

FOREIGN PATENT DOCUMENTS

CN 311201 7/1997

OTHER PUBLICATIONS

Lin et al, A Genetic Algorithm Approach to Chinese Handwriting Normalization, Dec. 1997, IEEE Paper ISSN: 1083–4419 vol. 27, No. 6, pp. 999–1006.*

Luo et al, A unit Decomposition technique Using Fuzzy Logic for Real–Time Handwritten Chinese Character Recognition, Dec. 1997, IEEE Paper ISSN:0278–0046, vol. 44, No. 6, pp. 840–847.*

* cited by examiner

Primary Examiner—Amelia M. Au
Assistant Examiner—Mehrdad Dastouri
(74) Attorney, Agent, or Firm—Greenblum & Bernstein, P.L.C.

(57) ABSTRACT

An on-line handwritten Chinese character recognition apparatus based on character shapes uses a reference file for look-up of compressed codes-sequence codes in a conventional input method founded on dismantling by character shapes as reference when comparing character to reduce the number of matching templates required in the on-line handwritten Chinese character recognition system and to lower the time for matching. Input handwritten Chinese characters are dismantled into constituting radicals. Thereafter, with reference to code retrieving rules of the input method, and based on the character composing method of handwritten characters, radicals for comparison are retrieved. Then, the compression formula of the input method is used to compress the codes of the base radicals, and the compressed codes are compared with contents of the input method reference file to obtain the sequence codes of candidate characters. Finally, the final recognized sequence code is decided via further comparison during post-processing. The character that corresponds to the sequence code in a character font file is the recognition result and is outputted.

1 Claim, 11 Drawing Sheets

FIG.6A

| STROKE NUMBER | RADICAL CODE 1 | RADICAL CODE 2 | CHARACTER CODE OF SIMILAR RADICAL | STROKE DIRECTION | STROKE LENGTH | INTERSECTING RELATIONSHIP |
|---|---|---|---|---|---|---|
| 1 | 13 (BASE RADICAL) | 0 | 0 | (0) | (4) | NULL |
| 1 | 27 (DERIVED RADICAL) | 12 | 26(-) | (6) | (4) | NULL |
| 2 | 10 (BASE RADICAL) | 0 | 28(ナ) | (0,6) | (4,4) | (0,1,1) |
| ... | | | | ... | | |
| 5 | 12 (BASE RADICAL) | 0 | 0 | (6,0,6,0,6) | (2,3,2,3,4) | (0,1,2)(0,3,2)(1,2,2)(1,4,1)(2,3,2)(3,4,1) |
| 5 | 15 (COMPOUND) | 21 | 0 | (5,0,0,0,6) | (2,3,2,3,4) | (0,1,3)(3,4,3) |
| 6 | 8 (BASE RADICAL) | 0 | 0 | (5,0,6,5,0,6) | (2,3,4,2,3,4) | (0,1,3)(1,2,3)(3,4,3)(4,5,3) |
| ... | | | | ... | | |

FIG.6B

| ENGLISH KEY | SPACE KEY | A | B | C | D | E | F | G | ... | Y |
|---|---|---|---|---|---|---|---|---|---|---|
| TSANG CHI RADICAL CODE | | 日 | 月 | 金 | 木 | 水 | 火 | 土 | ... | 卜 |
| RADICAL CODE | 0 | 1 | 2 | 3 | 4 | 5 | 6 | 7 | ... | 24 |

RADICAL CODE TABLE

FIG.6C

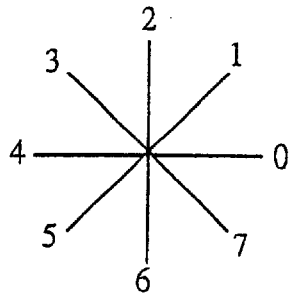

STROKE DIRECTION CODE

FIG.6D

INTERSECTING RELATION SHIP CODE

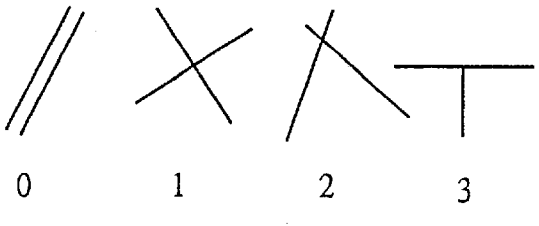

```
                          8800H"—"   "Z"8801H
SECTOR 0000000
       0000(0000)      3D6B69CDD577A79F- 6D096657CF5277C5
       0016(0010)      675D98BB75C4526D- 1FA379EB9D67370A
       0032(0020)      7CD56045F21345FB- 799C6AFA9D34E85E
       0048(0030)      DDB1AC6A175189BA- CAEFD474C9776D68
       0064(0040)      ED702B655410A2CE- 77EE1B340F5C61BB
       0080(0050)      437B08768393439C- F28289D77DC99E6A
       0096(0060)      0B56D1DCB96FA6DD- 9C0B738466E043B0
       0112(0070)      3F2BF2F69197C338- F1FE54293B745B33
       0128(0080)      59B666B2BABA7293- 9675593076BF2323
       0144(0090)      D76D72FA815FE312- 9AC54AAA1C0C65F0
       0160(00A0)      746D8261A08261A0- 91459812E9611B6C
       0176(00B0)      6C481854A9C94D2E- 8771DCD62263A173
       0192(00C0)      5F616F8F386B4C4F- 61DFDB8C0DBA17A4
       0208(00D0)      A44DA4609D69E475- 3D446C9030A8F47C
       0224(00E0)      6D285E6DBB05CFAB- AF7DFDA37C8EFC7D
       0240(00F0)      4A2581DCF67D3A70- 7F2AF17DEF5F7D8A
       0256(0100)      EC6DE1DE6FE0604F- E53C7A32A1CBB148
       0272(0110)      1ECE071B14831486- 98AD06F11A435C84
       0288(0120)      F1895D38C0850B73- 84F03C844F717E8C
       0304(0130)      F99AFDA37C44E146- B22FA5B43CD2F7EF
       0320(0140)      6FCAB35A651E73F7- 5F42BDF942FEB86C
       0336(0150)      4E5C8E56E75B492D- 4431E177BE0E336B
       0352(0160)      694F30949EAF0D88- 906A0E3035B8D42E
       0368(0170)      A2D22175D2217510- BF8179FB48619446
       0384(0180)      01DB89A02990D997- 524A08CE67BBCD31
       0400(0190)      9F442A86D0F11B08- F11B08E23710C46F
       0416(01A0)      207B08763CC4CE16- 476C8583BD408D86
       0432(01B0)      905E475EEC45B58B- 28A6A73001834594
       0448(01C0)      A11B1C815C391065- 0BE06B9BFA453A49
       0464(01D0)      4C72856BBA2F61CC- C087DA636D691F14
       0480(01E0)      A68A7DBED4CC6194- 46A689452A2442A4
       0496(01F0)      01B77E627C89FE7A- 54BD7B3B047B5A0D
```

FIG. 7

| SEQUENCE CODE | TOTAL STROKE NUMBER | COMPRESSED CODES OF STROKE NUMBERS OF RADICALS TO WHICH EACH STROKE BELONGS |
|---|---|---|
| 一 8800H | 1 | 0x6F91 |
| 乙 8801H | 3 | 0xE7B7 |
| ... | | |

| STROKE | | RADICALS THAT CAN BE FORMED RADICAL CONSTITUTING STROKES | | | RADICALS FORMED FROM MOST NUMBER OF STROKES |
|---|---|---|---|---|---|
| 1 | 一 | 一(1) | +(2) | 才(3) | 才(3) |
| 2 | 丨 | 丨(1) | +(2) | 才(3) | 才(3) |
| 3 | ノ | 一(1) | | 才(3) | 才(3) |
| 4 | 丶 | 丶(1) | 厂(2) | | 厂(2) |
| 5 | ノ | ノ(1) | 厂(2) | | 厂(2) |
| 6 | 丨 | 丨(1) | | | 丨(1) |
| 7 | 乀 | 乀(1) | | | 乀(1) |

FIG.9

| SINGLE FORM | EX : 更、是、鳥、亞。 |
|---|---|
| OUTSIDE-INSIDE | EX : 固 = 囗 + 古、因 = 囗 + 大。 |
| UP-DOWN | EX : 恩 = 因 + 心、芳 = 草 + 方。 |
| LEFT-RIGHT | EX : 姨 = 女 + 夷、促 = 人 + 足。 |
| PLURAL COLUMN | EX : 硼 = 石 + 月 + 月、湘 = 水 + 木 + 目。 |

| BASE RADICAL CODE | BASE RADICAL | DERIVED RADICAL | BASE RADICAL CODE | BASE RADICAL | DERIVED RADICAL |
|---|---|---|---|---|---|
| 1 | 日 | 口 | 13 | 一 | 一 厂 工 |
| 2 | 月 | 刀 冖 ツ 夕 | 14 | 弓 | 丨 フ ク 乙 |
| 3 | 金 | 八 儿 ソ | 15 | 人 | へ 卜 く ヽ イ |
| 4 | 木 | 十 ヤ | 16 | 心 | ヒ ケ 七 小 七 忄 |
| 5 | 水 | 又 氵 氺 | 17 | 手 | 丰 扌 扌 才 |
| 6 | 火 | ツ 小 灬 | 18 | 口 | |
| 7 | 土 | 土 圡 | 19 | 尸 | 亡 コ 丁 E |
| 8 | 竹 | 尸 丿 | 20 | 廿 | 艹 ピ 廿 丬 艹 |
| 9 | 戈 | 冫 宀 ム | 21 | 山 | 凵 乚 屮 |
| 10 | 十 | 宀 | 22 | 女 | く L レ ⻏ |
| 11 | 大 | メ ナ 疒 | 23 | 田 | 刁 口 |
| 12 | 中 | 一 衤 丰 | 24 | 卜 | 亠 氵 辶 卜 |
| * | COMPOUND RADICAL | 門 目 鬼 鬥 隹 幾 声 古 气 阝 | | | |

FIG. 12

ON-LINE HANDWRITTEN CHINESE CHARACTER RECOGNITION APPARATUS

BACKGROUND OF THE INVENTION

1. Field of the Invention

The invention relates to the on-line deciphering of handwritten Chinese characters based on character shapes and, more particularly, to an on-line handwritten Chinese character recognition apparatus which refers to a character compressed code-sequence code reference file of an input method and compares character shapes by using constituted radicals for recognition.

2. Description of the Related Art

Conventional character recognition methods generally employ a template matching method, where the outline of an unknown input character is compared one at a time with previously stored character pen ink templates. The recognition result is the compared template with the greatest similarity and the least difference. This technique requires the storage of a large number of character pen ink templates in order to achieve a better recognition effect. A majority of character recognition methods use classification methods or other comparison methods in combination with the template technique with the aim of reducing the time that is spent when comparing a large number of character pen ink templates. However, there is still a need to store a large number of character pen ink templates.

The feature of the invention disclosed in R.O.C. Patent Publication No. 311201, entitled "Handwritten Chinese Character Recognition System Based On Front and Rear Radicals" resides in that the front radicals and the rear radicals are employed to classify Chinese characters into three major classes, i.e., front radical plus rear remainder part of character, rear radical plus front remainder part of character, and single form character. A Chinese recognition system is then established by using this classification method. FIG. 13 illustrates a block diagram of a model board establishing portion of the system, comprising:

- a Chinese character ink database 10 for storing 80 groups of Chinese character pen ink data, each group having 5401 characters written by different people;
- a Chinese character ink classifier 11 for grouping Chinese characters based on the classification method to determine whether they are front radical characters, rear radical characters, or single form characters;
- a radical separator 12 for separating front radical characters into a front radical portion and a rear remainder part of character, or for separating rear radical characters into a rear radical portion and a front remainder part of character;
- a single form character model board generator 13 for extracting feature points of the single form characters and for storing sequentially these features in a single form character model board 16 according to the number of strokes of the single form characters;
- a radical model board generator 14 for extracting features of the front radicals and the rear radicals, and for storing sequentially these features in a front radical model board 17 and in a rear radical model board 18 according to the number of strokes of the radicals; and
- a remainder character model board generator 15 for extracting features of the front remainder part of characters and the rear remainder part of characters, and for storing sequentially these features in a front remainder character model board 19 and, in a rear remainder character model board 20 according to the number of strokes of the remainder part of character.

FIG. 14 illustrates a block diagram of the conventional recognition system. The recognition system comprises:

- a pre-processor 21 for removing noise signals, smoothening, shift correction, rotary translation correction, size normalization and desired feature extracting processing of original pen inks;
- a filter 22 for filtering selectively a possible model board using partial features of the input pen inks; a front radical comparator 23 for separating a possible front radical portion from the input pen inks, for making a detailed comparison with the sifted front radical model board, for calculating the degree of similarity therewith, and for recording the ten highest front radicals;
- a rear radical comparator 24 for separating a possible rear radical portion from the input pen inks, for making a detailed comparison with the sifted rear radical model board, for calculating the degree of similarity therewith, and for recording the ten highest rear radicals;
- a rear remainder character comparator 25 compares the current input strokes with those in the rear remainder character model board whose corresponding the front radical are on the first 10 list of the result of the front radical comparator 23, and then combines the degree of similarity acquired in the front radical comparator 23 operations and that in the current stage to gain the degree of similarity of the current input character;
- a front remainder character comparator 26 compares the current input strokes with those in the front remainder character model board whose corresponding the rear radical are on the first 10 list of the result of the rear radical comparator 24, and then combines the degree of similarity acquired in the rear radical comparator 24 operations and that in the current stage to gain the degree of similarity of the current input character;
- a single form character comparator 27 for calculating the degree of similarity between the sifted single form character model board and the input pen inks; and
- a winner decider 28 for arranging the degrees of similarity after comparison and for retaining the top ten characters with the greatest degree of similarity as the recognition result.

Some of the drawbacks of the invention disclosed in R.O.C. Patent Publication No. 311201, entitled "Handwritten Chinese Character Recognition System Based On Front and Rear Radicals" are as follows:

1. Many sets of Chinese character pen ink data (each set including 5401 characters that serve as recognition parties) are needed during the model board establishing stage and the character recognition stage.

2. A large model board (templates) must be pre-established, thereby requiring a large amount of time.

SUMMARY OF THE INVENTION

In view of the fact that the aforementioned template matching requires the storage of a large number of character pen ink templates that results in waste of storage space and template matching time, the object of the present invention is to provide an on-line handwriting recognition apparatus based on character shapes to reduce the storage space of character ink templates and the matching time.

In order to overcome the aforementioned drawbacks, the present invention provides an on-line handwritten Chinese character recognition apparatus having a buffer region for temporary storage of data and an output portion, characterized by comprising:

a radical template feature memorizing portion including shape features of basic radicals (i.e., base radicals) or related radicals (i.e., derived radicals) defined by an input method based on dismantling by character shapes;

an input method reference portion founded on a conventional input method based on dismantling by character shapes, and including an input method system data file for character compressed code and sequence code look-up information;

an exception character description portion for recording features of exception characters to aid a post-processing portion in deciding a final recognition result from among candidate characters;

an input portion including a digitizing tablet and a pen of a conventional on-line character handwriting equipment;

a pre-processing portion for normalization and line thinning processing of input handwritten character, and for extracting features needed in character recognition for storage in the buffer region;

a character shape dismantling portion for dismantling character based on the features of the handwritten character extracted by the pre-processing portion and with reference to the radical template feature memorizing portion so as to find the radicals that can form the handwritten character;

a comparator portion for comparing the constituted radicals found by the character shape dismantling portion with contents of the input method reference portion to get candidate characters that have difference values below a threshold value;

the post-processing portion deciding the final recognition result from among the candidate characters based on other features of the handwritten character and with reference to contents of the exception character description portion, and for transferring the final recognition result to the output portion for output.

From the foregoing construction, the on-line handwritten Chinese character recognition apparatus of this invention dismantles handwritten characters into the constituted radicals via character shape dismantling means so that a character compressed code and sequence code look-up table of a conventional input method based on dismantling by character shapes can be used directly to obtain the recognition result. The number of templates required for matching in the on-line handwritten Chinese character recognition system can be reduced, and the time for matching can be lowered.

BRIEF DESCRIPTION OF THE DRAWINGS

Other features and advantages of the present invention will become apparent in the following detailed description of the preferred embodiment with reference to the accompanying drawings, in which:

FIGS. 6A, 6B, 6C and 6D are schematic views of the structure of a radical template feature memorizing portion of the preferred embodiment of this invention;

FIG. 7 is a schematic view of the structure of an input method reference portion of the preferred embodiment of this invention;

FIG. 8 is a schematic view of the structure of an exception character description portion of the preferred embodiment of this invention;

FIG. 9 illustrates the character radical set obtained after the character "抓" is dismantled in accordance with the preferred embodiment of this invention;

FIG. 12 illustrates the radical template set of the preferred embodiment of this invention, including twenty-four Tsang Chi base radicals, seventy-four derived radicals, and ten compound radicals;

DETAILED DESCRIPTION OF THE PREFERRED EMBODIMENT

The Tsang Chi input method based on dismantling of characters by character shapes is the foundation of character recognition in the preferred embodiment. The base radicals, derived radicals and compound radicals defined in the Tsang Chi input method are the radical template set indicated in the preferred embodiment, as shown in FIG. 12. According to the structures and character composing principles of Chinese characters, Chinese characters are attributed in the Tsang Chi input method into twenty-four Tsang Chi base radicals and seventy-four derived radicals. Thereafter, based on Tsang Chi code-retrieving rules, a Chinese character is dismantled into Tsang Chi codes at most, whereby the correct Tsang Chi codes are inputted to obtain the correct character.

Figure 1:
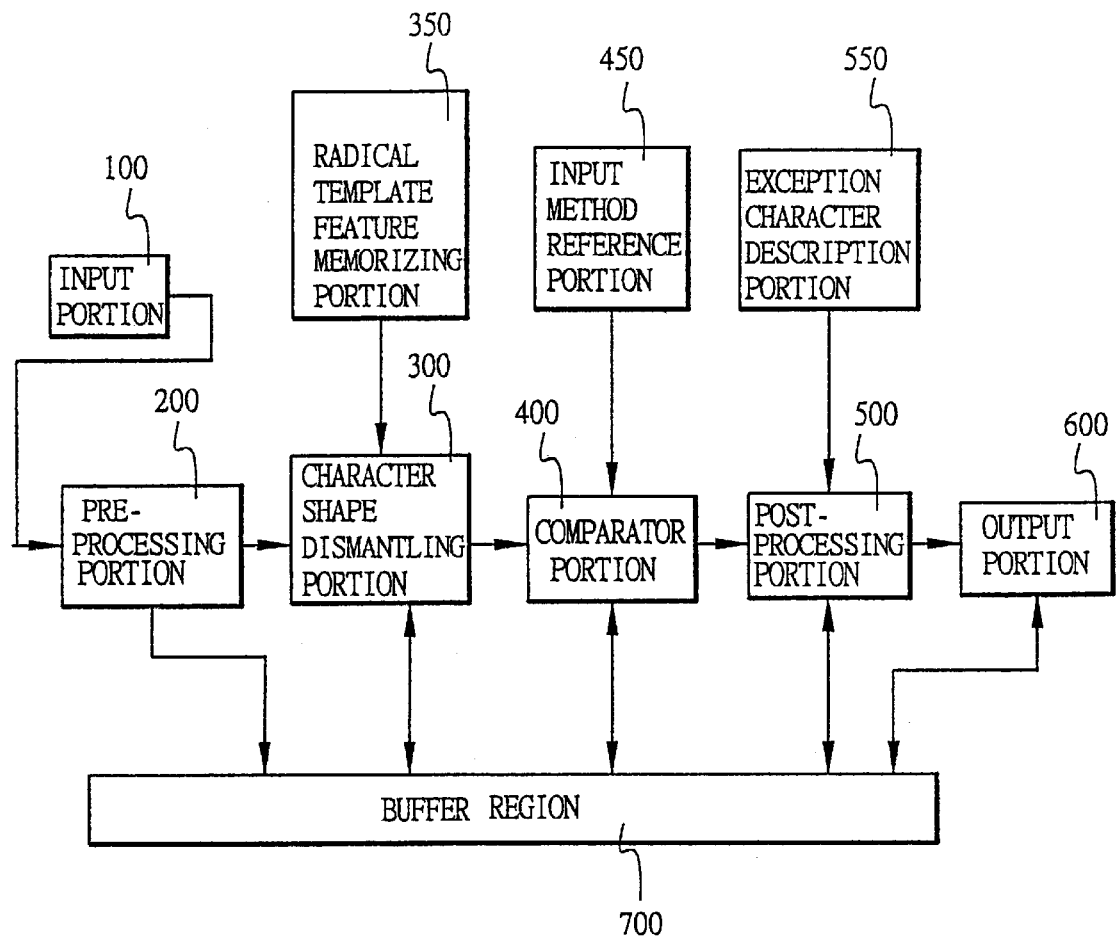
FIG. 1 is a system block diagram of a preferred embodiment of this invention.

FIG. 1 is a block diagram of the preferred embodiment of an on-line handwritten Chinese character recognition apparatus according to the present invention. Input portion 100, such as a digitizing tablet, is provided to enable the user to perform on-line character writing. Pre-processing portion 200 is provided to perform normalization and line thinning processing of the handwritten characters that were inputted by the user, and to divide each character using character separating techniques into five groups, i.e., outside-inside, up-down, left-right, plural column, or single form (see FIG. 11). Then, the features of the character are extracted and are stored in a buffer region 700. The extracted features include: intersecting relationships between strokes, positions of the strokes, start and end point directions of the strokes, the level to which each stroke belongs, etc. The level to which each stroke belongs is determined by the character stroke writing sequence and the single form to which it belongs. The buffer region 700 is used to store related data and features of the input strokes.

Character shape dismantling portion 300 dismantles character by comparing the character features with contents of a radical template feature memorizing portion 350 to get radical set that can be constituted from each stroke. Thereafter, based on code retrieving rules, the codes for the base radicals to which the radical set that can form the character belong are picked. The radical template feature memorizing portion 350 is used to store the features of all radical template. A detailed construction of the same is shown in FIGS. 6A to 6D. The data for each radical template includes the number of strokes, stroke features such as direction and length, intersecting relationship between strokes, and the codes of similar radical templates.

Comparator portion 400 is responsible for comparing compressed codes corresponding to the codes of base radical to which the radical set obtained after dismantling character belong with the contents of an input-method reference portion 450 to find sequence codes of candidate characters. The input method reference portion 450 includes an input method system data file for character compressed code and sequence code look-up data, and is used to aid the comparator portion 400 in obtaining the sequence codes of the candidate characters. A portion of the contents used in the present invention is shown in FIG. 7.

Post-processing portion 500 refers to an exception character description portion 550 to find the final recognition result from among the many candidate characters. The exception character description portion 550 is a reference portion for aiding the post-processing portion 500 in finding the final recognition result from among the many candidate characters. The structure of the exception character description portion 550 is shown in FIG. 8. Each sequence code (which represents one character) includes a total stroke number, and compressed data, with 13 as a base, and in which the stroke numbers of the character codes that form the exception character are compressed.

Figure 2:
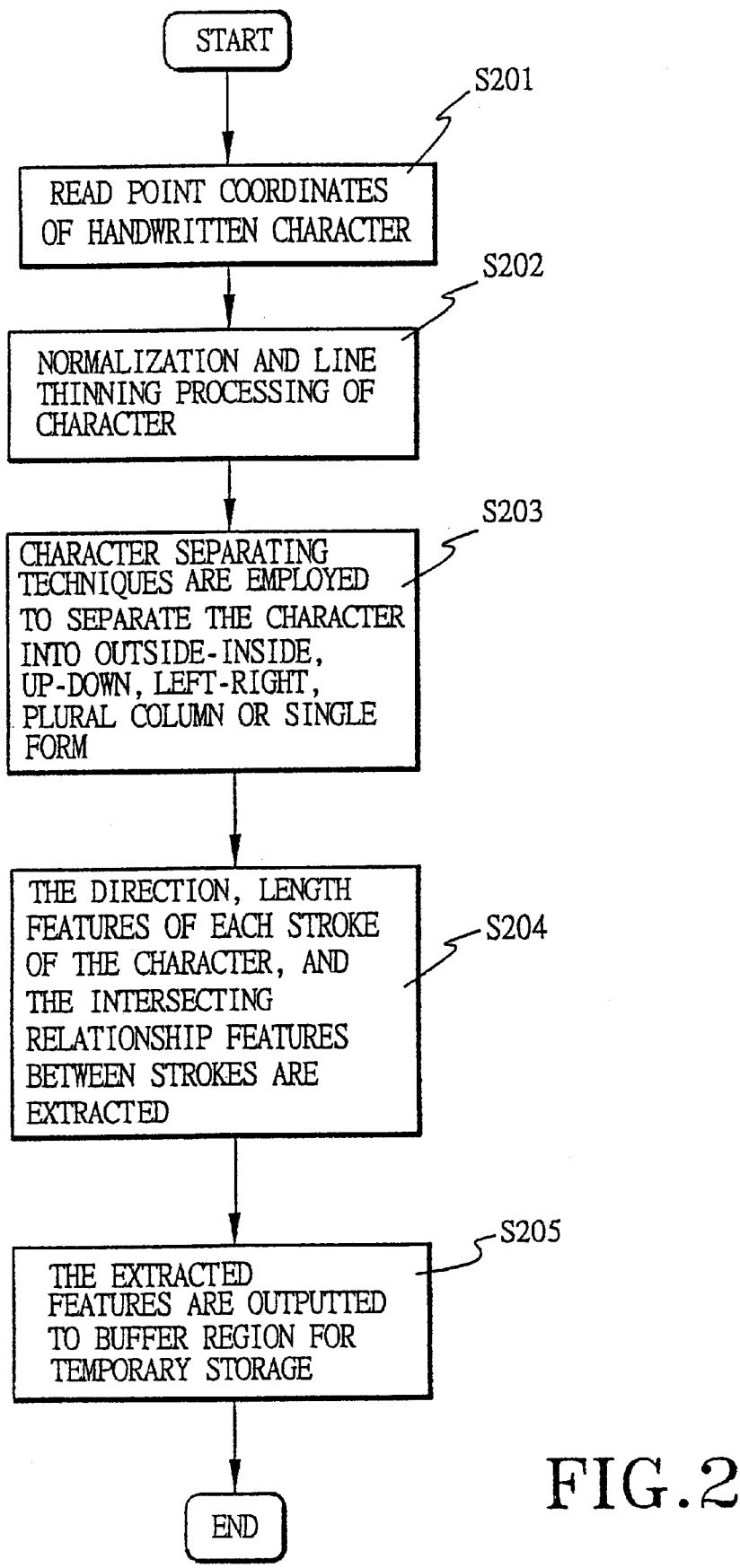
FIG. 2 is a process flowchart of a pre-processing portion of the preferred embodiment of this invention.
Figure 3:
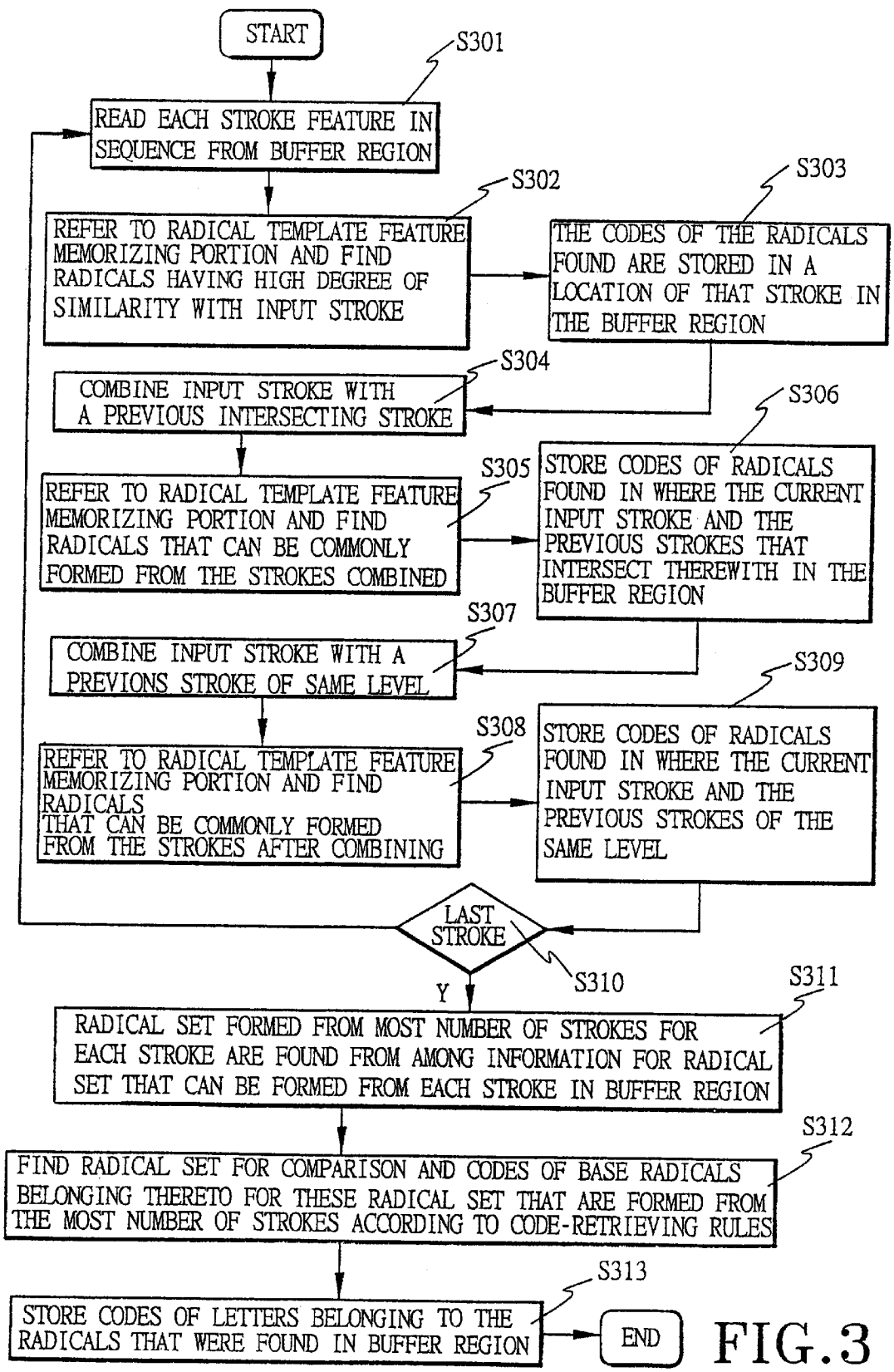
FIG. 3 is a process flowchart of a character shape dismantling portion of the preferred embodiment of this invention.
Figure 4:
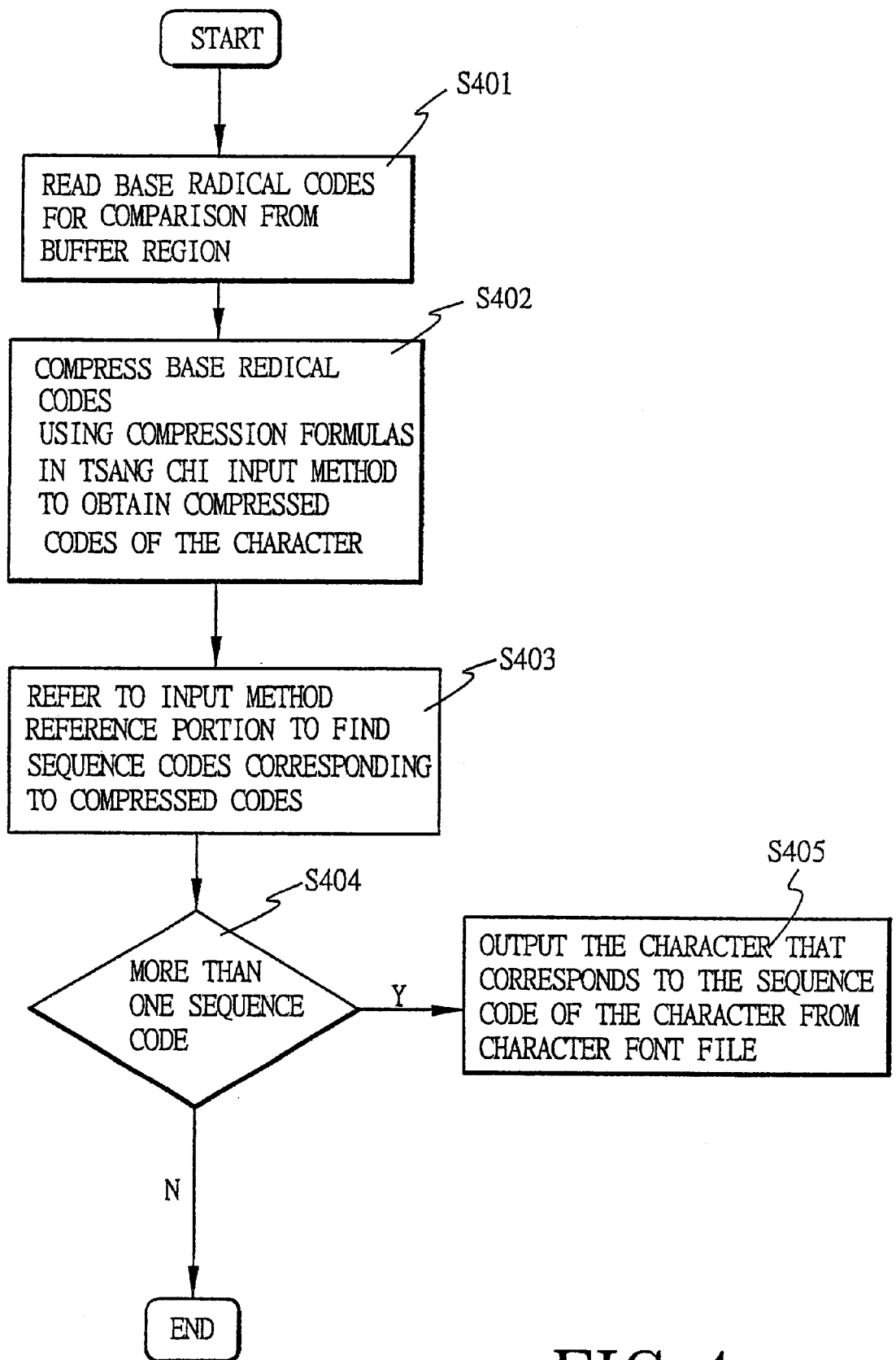
FIG. 4 is a process flowchart of a comparator portion of the preferred embodiment of this invention.
Figure 5:
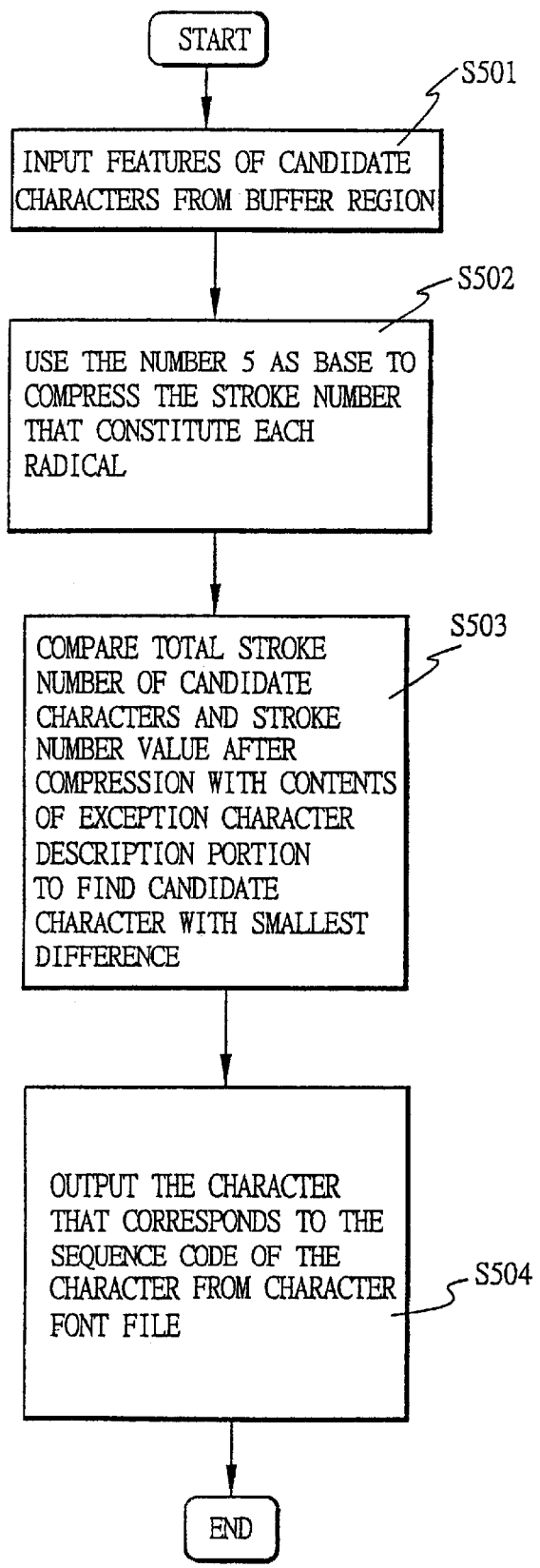
FIG. 5 is a process flowchart of a post-processing portion of the preferred embodiment of this invention.

In conjunction with the structure of the aforementioned apparatus, FIG. 2 shows a process flowchart of the pre-processing of the input handwritten character, and the extracting of features as performed by the pre-processing portion 200. FIG. 3 shows a process flowchart of the dismantling of input character and the selecting of the base radical codes as performed by the character shape dismantling portion 300. FIG. 4 is a process flowchart illustrating how candidate characters are found by comparing compressed codes corresponding to the base radical codes belonging to the input character with the contents of the input method reference portion 450 as performed by the comparator portion 400. FIG. 5 is a process flowchart illustrating how an output character is decided from among the candidate characters as performed by the post-processing portion 500.

As shown in FIG. 2, the pre-processing portion 200 reads point coordinates of the handwritten character in step s201. Thereafter, normalization and line-thinning processing of the character are performed in step s202. In step s203, character separating techniques are employed to separate the character into outside-inside, up-down, left-right, plural column or single form. In step s204, the direction and length features of each stroke of the character, and the intersecting relationship features between strokes are extracted. Finally, in step s205, the extracted features are outputted to the buffer region 700 for temporary storage.

As shown in FIG. 3, according to the stroke sequence, each stroke feature extracted by the pre-processing portion 200 is read from the buffer region 700 in step s301. In step s302, reference is made to the radical template feature memorizing portion 350 in order to compare the features of the input stroke with the features of each radical template stored in the radical template feature memorizing portion 350 so as to find the radical set that have a high degree of similarity with the input stroke. In step s303, the codes of the radicals that were found are stored in a location of that stroke in the buffer region 700. Thereafter, in step s304, the input stroke is combined with previous strokes that intersects the same and, with reference to the radical template feature memorizing portion 350, the shape combined is compared with the features of each radical template stored in the radical template feature memorizing portion 350 in step s305 in order to find the radicals that can be commonly formed from the strokes combined. In step s306, the codes of the radicals found are stored in the buffer region 700 where the relevant information about the current strokes and the associated intersecting ones is stored. In step s307, the input stroke is combined with previous strokes of the same level and, in step s308, reference is made to the radical template feature memorizing portion 350 in order to compare the shape combined with the features of the radical templates stored in the radical template feature memorizing portion 350 so as to find the radicals that can be commonly formed from the combined strokes. In step s309, the codes of the radicals that were found are stored in locations of the input stroke and the previous strokes of the same level in the buffer region 700. Since the maximum number of strokes for a radical template is thirteen ("鬼"), inspection of up to only twelve strokes is done when the step of combining with previous strokes is performed. In step s310, after inspection all strokes, the radical set that are formed from the most number of strokes for each stroke are found from among the information for radical set that can be formed from each stroke in the buffer region 700 in step s311. After the radicals that can be formed from the most number of strokes for all of the strokes have been found, radical set for comparison and the codes of base radicals belonging thereto are found for these radical set that are formed from the most number of strokes according to code-retrieving rules in step s312. In step s313, the codes of the base radicals that the radicals found belong to are stored in the buffer region 700.

Figures 10, 11:
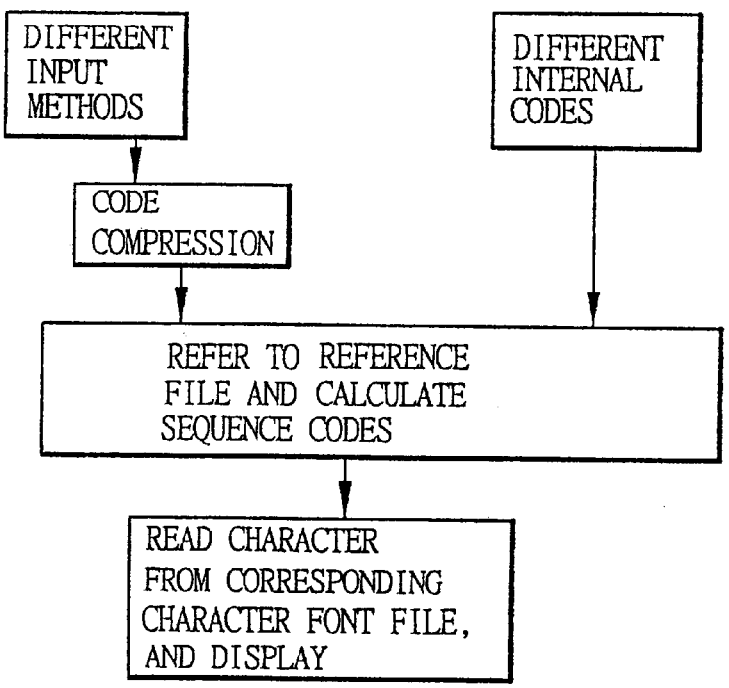
FIG. 10 is a schematic view illustrating the relationship between input method character codes and sequence codes in accordance with the preferred embodiment of this invention.
FIG. 11 illustrates five groups of character separation in accordance with the preferred embodiment of this invention.
Figure 13:
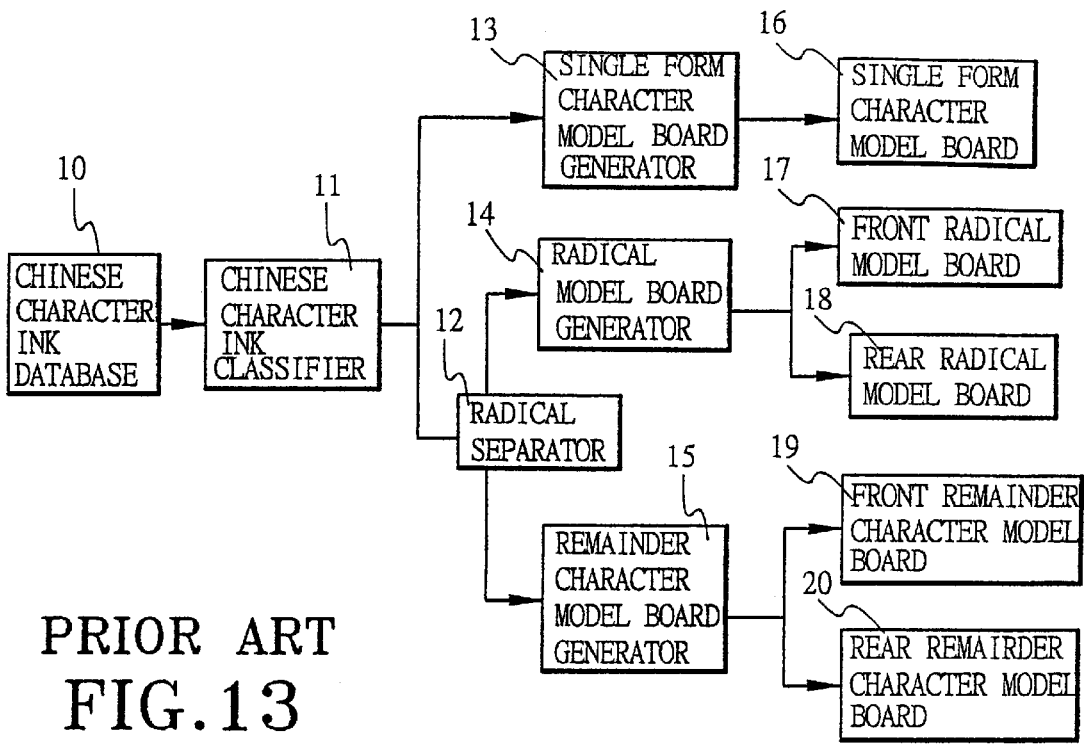
FIG. 13 is a block diagram illustrating a model board establishing portion of an embodiment in the prior art.
Figure 14:
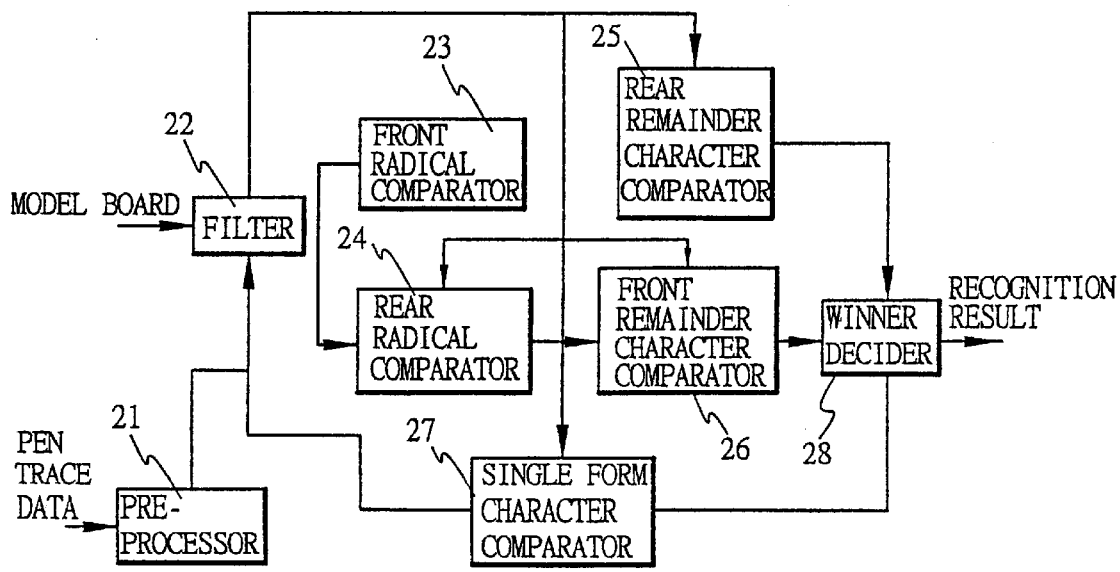
FIG. 14 is a flowchart of a recognition system portion of an embodiment in the prior art.

The breakthrough of this invention as compared to the prior art, e.g., the comparison technique of the comparator portion 400 can speed up the matching speed and the reduce data storage space, will now be described in the succeeding paragraphs. The present invention originates in that: different input methods may have been used in the same Chinese system. A different storage format may have also been employed. However, the final result is that the same character font file is read. In order to enable the Chinese character font file to adapt to these circumstances, values known as sequence codes are generated. In the input method, compression formulas are used to compress the codes of the character. Reference is then made to an input method system reference file that includes look-up data for compressed codes and sequence codes, and calculations are made (adding the sequence code initial values) to find the sequence code that corresponds to the compressed code. These sequence codes denote the sequence of the characters stored in each character font file. Once the sequence codes have been obtained, the character font file can be read to retrieve the characters, as shown in FIG. 10. Moreover, in some input methods that are based on dismantling by character shapes, the code sets constituted for some character are not unique. As such, different characters can have the same group of codes. Therefore, the on-line handwritten Chinese character recognition apparatus of this invention performs post-processing in view of these circumstances.

FIG. 4 describes the comparison operation flowchart of the comparator portion 400. In step s401, the comparator portion 400 retrieves the base radical codes outputted by the character shape dismantling portion 300 from the buffer region 700 for comparison. In step s402, compression of the base radical codes is performed according to the compression formulas used in the Tsang Chi input method. Thereafter, in step s403, reference is made to the input method reference portion 450 to find sequence codes of character that differ from the compressed codes by no more than a threshold value T. In step s404, it is determined whether more than one sequence codes can be found. If yes, the character that corresponds to the sequence code is outputted from the character font file as the recognition result in step s405. If the sequence code of more than one character was found, the sequence codes of the candidate characters are stored in the buffer region 700 for subsequent post-processing operation by the post-processing portion 500.

Referring to FIG. 5, in step s501, the stroke number features of the radical set that form the candidate characters are inputted from the buffer region 700. Thereafter, in step s502, the post-processing portion 500 initially uses the number 5 as base for compressing the number of strokes that constitute each radical of the handwritten character. In step s503, the total stroke number of the candidate characters and the stroke number value after compression are compared with the contents of the exception character description portion 550 to find the candidate character with the smallest difference. In step s504, the character in the character font file that corresponds to the sequence code of the character is outputted to the output portion 600 as the recognition result.

In the example which follows, the Chinese character, "抓" is handwritten on a line to illustrate the processing of the basic operation of the on-line handwritten Chinese character recognition apparatus of this invention with reference to the character shape dismantling process flowchart of FIG. 3, the character comparing process flowchart of FIG. 4, and the character post-processing flowchart of FIG. 5. The base radicals, the derived radicals, the code-retrieving rules, the code compression method and other related principles in the conventional Tsang Chi input method serve as the background of the present embodiment.

After the handwritten character "抓" is inputted using the input portion 100, step s202 is performed for normalization and the line-thinning processing by the pre-processing portion 200. In step s203, character separating techniques are employed to separate the character into two left and right sole bodies: "扌" and "爪". In step s204, the direction and length features of each stroke of the character and the intersecting relationship features between strokes are extracted. These features are stored in the buffer region 700 in step 205.

Subsequently, with reference to FIG. 3, the features of the first stroke "—" are retrieved from the buffer region 700 in step s301. In step s302, reference is made to radical template feature memorizing portion 350 (see FIGS. 6A to 6D) for comparing with the features of the radical template whose stroke number is 1 to get the radical "—" that has the greatest similarity. In step s303, the code (e.g., 13) of the radical "—" stored in the buffer region 700 at the location for recording the data of the first stroke "—". Since this is the first stroke, and since no other stroke has been inspected beforehand, steps s304 to s309 need not be performed. The flow proceeds once again to step s301 to retrieve the features of the second stroke "|" from the buffer region 700. In step s302, reference is made to the radical template feature memorizing portion 350 for comparing with the features of the radical templates whose stroke number is 1 to get the radical "|" that has the greatest similarity. In step s303, because the radical is a derived radical, the radical code and its base radical code (e.g., 27, 12) of the radical "|" are stored in the buffer region 700 at the location for recording the data of the second stroke "|". Then, in step s304, the second stroke is combined with the first stroke ("—") that intersects therewith. In step s305, reference is once again made to the radical template feature memorizing portion 350 to compare the combined character shape "+" with the features of the radical templates whose stroke number are 2 to get the radical "+" that has the greatest similarity. In step s306, the code (e.g., 10) for "+" stored in the buffer regions 700 at the locations for recording the data of the second stroke "|" and the first stroke "+". In steps s307 to s309, the radicals that can be formed from the combined strokes and the other strokes that were previously inspected are found and are recorded in the buffer region 700. The list of radical set found for all of the strokes by performing the aforementioned steps is shown in FIG. 9.

After all of the strokes have been inspected, in step s311, from the list of FIG. 9 of the radical set for each stroke as recorded in the buffer 700, the radicals that is formed from the most number of strokes is found for each stroke according to the stroke input sequence: "才" (base radical is 手, total stroke number is 3), "才" (手, 3), "才" (手, 3), "厂" (竹, 2), "厂" (竹, 2) "|" 中, 1), (人, 1). In step s312, since "抓" can be separated into left and right sole bodies, based on the Tsang Chi code retrieving rules, "才" is first retrieved as the left part of character. This belongs to the base radical "手", the base radical code of which is 17. Three codes are retrieved for the right part of character: "", "/", "•" belonging respectively to the base radical "竹", "中", "人", the base radical codes of which are 8, 12, 15, respectively. Finally, in step s313, the base radical codes 17, 8, 12, 15 are stored in the buffer region 700.

In step s401, the comparator portion 400 retrieves the codes from the character shape dismantling portion 300 for comparison. In step s402, the compression formula employed in the Tsang Chi input method is used to compress the base radical codes: compressed code=$17 \times 27^4 + 12 \times 27^3 + 15 \times 27^2 + 8 \times 27 + 0$. In step s403, the sequence codes of two characters, "抓" and "抓", which differ from the compressed code by a value below the threshold value T, are found by using the compressed code to look-up the input method reference portion 450 and by making calculations (adding the sequence code initial values). In step s404, it is determined that more than one sequence code was found, and the two sequence codes are outputted to the post-processing portion 500 for post-processing operation.

In step s502, the post-processing portion 500 compresses the number of strokes that constitute each radical using 13 as a base. The stroke numbers are 3 (手 ... "才"), 2 (竹 ... "厂"), 1 (中 ... "|"), 1 (人 ... "|"), respectively. The value F after compression=$3 \times 13^4 + 2 \times 13^3 + 1 \times 13^2 + 1 \times 13 + 0$. Thereafter, in step s503, the F value and the total stroke number (7) of handwritten character are compared with the those of "抓" and "鬼" in the exception character description portion 550, and it is determined that "抓" is the one with the least average difference. Finally, in step s504, the character corresponding to the sequence code of "抓" in the character font file is outputted at the output portion 600 as the recognition result.

The Tsang Chi input method used in the aforementioned embodiment is but one form of environment of the present invention. The present invention is not limited to the aforementioned embodiment. As long as the input method is based on dismantling by character shapes, it can be used as the preferred environment of the present invention. The radicals in the input method are used as the radical templates when dismantling character in the present invention. As for the code retrieving rules and the code compression formulas used in the input method, these can be modified for implementation as long as the techniques for dismantling by radical and comparing operations remain unchanged.

With all of the character included in the Tsang Chi input method as possible recognition parties, when the on-line handwriting recognition apparatus of this invention founded on the Tsang Chi radicals is in use, deciphering of handwritten characters employing the technique can have a recognition efficiency of up to more than 92%. Since the present invention uses existing Tsang Chi codes for presenting relation between radicals, storage of a large number of character pen ink templates for recognition is not needed to lower the database space.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An on-line handwritten Chinese character recognition apparatus having a buffer region for temporary storage of data and an output portion, said apparatus comprising:

a radical template feature memorizing portion including shape features of base radicals or derived radicals defined by an input method based on dismantling by character shapes;

an input method reference portion founded on a conventional input method based on dismantling by character shapes, and including an input method system data file for character compressed code and sequence code look-up information;

an exception character description portion for recording features of exception characters to aid a post-processing portion in deciding a final recognition result from among candidate characters;

an input portion including a digitizing tablet and a pen of a conventional on-line character handwriting equipment;

a pre-processing portion for normalization and line-thinning processing of input handwritten character, and for extracting features needed in character recognition for storage in the buffer region;

a character shape dismantling portion for dismantling character based on the features of the handwritten character extracted by the pre-processing portion and with reference to radical template feature memorizing portion so as to find the radicals that can form the handwritten character;

a comparator portion for comparing the constituted radicals found by the character shape dismantling portion with contents of the input method reference portion to get candidate characters that have difference values below a threshold value;

the post-processing portion deciding the final recognition result from among the candidate characters based on other features of the handwritten character and with reference to contents of the exception character description portion, and for transferring the final recognition result to the output portion for output.

* * * * *